(12) United States Patent
Kizuki et al.

(10) Patent No.: US 7,756,386 B2
(45) Date of Patent: Jul. 13, 2010

(54) AV DATA RECORDING METHOD, AV DATA REPRODUCTION METHOD, AND AV DATA RECORDING MEDIUM

(75) Inventors: Hideaki Kizuki, Chiba (JP); Katsushi Ohizumi, Chiba (JP); Jiro Kiyama, Funabashi (JP)

(73) Assignee: Sharp Kabushiki Kaisha, Osaka (JP)

( * ) Notice: Subject to any disclaimer, the term of this patent is extended or adjusted under 35 U.S.C. 154(b) by 1258 days.

(21) Appl. No.: 10/559,123

(22) PCT Filed: May 21, 2004

(86) PCT No.: PCT/JP2004/006944

§ 371 (c)(1),
(2), (4) Date: Dec. 1, 2005

(87) PCT Pub. No.: WO2005/001837

PCT Pub. Date: Jan. 6, 2005

(65) Prior Publication Data

US 2006/0140067 A1      Jun. 29, 2006

(30) Foreign Application Priority Data

Jun. 30, 2003   (JP)   ............................ 2003-187017

(51) Int. Cl.
   *H04N 5/91* (2006.01)
(52) U.S. Cl. .................. 386/46; 345/7; 386/68
(58) Field of Classification Search .................. 386/46
   See application file for complete search history.

(56) References Cited

U.S. PATENT DOCUMENTS 6,064,380 A * 5/2000 Swenson et al. ............ 715/273

2003/0016945 A1 * 1/2003 Nakamura ................... 386/46

FOREIGN PATENT DOCUMENTS

| JP | 5-290503 A | 11/1993 |
| JP | 8-251531 A | 9/1996 |
| JP | 9-231728 A | 9/1997 |
| JP | 10-64245 A | 3/1998 |

(Continued)

*Primary Examiner*—Marsha D Banks Harold
*Assistant Examiner*—Daniel Tekle
(74) *Attorney, Agent, or Firm*—Birch, Stewart, Kolasch & Birch, LLP

(57) ABSTRACT

After reproduction of AV data is interrupted, the story before the interruption can easily be grasped and accompanying information associated with a character is displayed as is necessary. A main file (101) of the AV data recorded on an AV data recording medium (10) is divided into one or more chapters (101a, 101b, . . . ) and recorded. A digest of each chapter is recorded as digest data (102a, 102b, . . . ) and recorded in a digest file (102), which is correlated to each chapter of the main file (101) and recorded on the same or different AV data recording medium (10) as or from the main file (101). When reproducing the interrupted main file (101), the digest file (102) corresponding to the respective chapters before the interruption is reproduced before the main file (101) interrupted is reproduced. Moreover, instead of the digest file (102), it is possible to record accompanying information on a character such as a person coming on the scene and select the type of accompanying information to be reproduced.

1 Claim, 6 Drawing Sheets

FOREIGN PATENT DOCUMENTS

| | | |
|---|---|---|
| JP | 10-74376 A | 3/1998 |
| JP | 11-32288 A | 2/1999 |
| JP | 11-273227 A | 10/1999 |
| JP | 2000-182364 A | 6/2000 |
| JP | 2000-331466 A | 11/2000 |
| JP | 2001-54071 A | 2/2001 |
| JP | 2002-25235 A | 1/2002 |
| JP | 2003-61055 A | 2/2003 |

* cited by examiner

AV DATA RECORDING METHOD, AV DATA REPRODUCTION METHOD, AND AV DATA RECORDING MEDIUM

TECHNICAL FIELD

The present invention relates to an AV data recording method, AV data reproduction method and AV data recording medium and relates to an AV data recording method when AV data are recorded on an AV data recording medium, an AV data reproduction method reproducing AV data recorded on an AV data recording medium, and an AV data recording medium for recording and reproducing AV data.

BACKGROUND OF THE INVENTION

Recently, along with the popularization of DVDs and the like, content such as movies recorded on DVDs increasingly tend to be reproduced and watched at home in a convenient time slot. If content such as movies are watched with the use of DVDs and the like, an environment is provided for enabling to stop watching at an arbitrary time and for enabling to watch the rest subsequent to the portion stopped at the arbitrary time. However, if the intermission is elongated, it is difficult to sufficiently remember previously watched content.

For such an issue, Japanese Laid-Open Patent Publication No. H11-273227 "DVD Video Reproducing System Having Digest Reproducing Function in Intermittent Reproducing" (Patent Document 1) proposed a system for conducting digest reproduction for a certain time for content of every chapter before an intermitted portion. In other words, according to the publication, as a digest for intermittent reproducing content, a digest can be reproduced from the beginning of the chapter including the intermitted portion or from a portion specified by a user within a chapter in advance during reproduction and then, the rest can be reproduced from the intermitted portion.

Patent Document 1: Japanese Laid-Open Patent Publication No. H11-273227 (pages 3 to 5, FIG. 3)

DISCLOSURE OF THE INVENTION

Problems to be Solved by the Invention

However, as the technology shown in Patent Document 1, in a method digesting a certain time from the beginning of the intermitted chapter or digesting a certain time from a portion specified in advance by a user, who does not watch the content until the end, i.e., who does not completely comprehend details of the content, it is difficult to say that such a digest has an optimum scenario for a user to remember content before the intermission. Also, since the digest generated by such a method is made up of a main volume of the content such as a movie and, for example, AV data such as audio and image scenes of movie descriptions in TV programs are not inserted, if a user watches the digest, the user often cannot easily remember the scenario before the intermission.

The present invention is devised in consideration of such a situation; AV data such as a movie recorded in a given recording medium including DVDs and others are divided into one or more sections and recorded as first AV data; information associated with each of the sections, for example, accompanying information including a digest showing a synopsis or an overview of characters such as the appearing characters and the like is recorded as second AV data correspondingly to each of the sections; and by reproducing the second AV data as digest reproduction, it is intended to enable a user to easily remember a story before the intermission or to enable the accompanying information relating to characters who appear in the movie and the like to be displayed suitably.

Means for Solving the Problems

A first technical means is characterized by an AV data recording method (or apparatus) for recording AV data onto an arbitrary recording medium, wherein a first AV data are divided into one or more sections to be recorded onto the recording medium, wherein a second AV data having information associated with each of the sections of the first AV data recorded on the recording medium are recorded onto the same recording medium as the recording medium recording the first AV data or a different recording medium, correspondingly to each of the sections of the first AV data, wherein section identification information is included as the second AV data recorded correspondingly to each of the sections of the first AV data, which can identify each section starting from the beginning section of the first AV data to a section immediately before the section made correspond to the second AV data, and wherein when reproduction of the second AV data is instructed, based on the section identification information, the reproduction is started from the second AV data corresponding to the beginning section to reproduce each piece of the second AV data corresponding to each section until the section immediately before, which is specified in the section identification information as a section indicating unreproduced beginning of the first AV data.

A second technical means is characterized by the AV data recording method of the first technical means, wherein if the second AV data is reproduced, the section identification information is recorded so that the reproduction is not performed for the second AV data corresponding to sections of the sections of the first AV data not yet reproduced.

A third technical means is characterized by an AV data reproduction method (or apparatus) for reproducing AV data recorded on an arbitrary recording medium, which switches and reproduces either a first AV data divided into one or more sections and recorded onto the recording medium or a second AV data having information associated with each of the sections of the first AV data recorded onto the same recording medium as the recording medium recording the first AV data or a different recording medium, correspondingly to each of the sections of the first AV data, wherein section identification information is included as the second AV data recorded correspondingly to each of the sections of the first AV data, which can identify each section starting from the beginning section of the first AV data to a section immediately before the section made correspond to the second AV data, and wherein when reproduction of the second AV data is instructed, based on the section identification information, the reproduction is started from the second AV data corresponding to the beginning section to reproduce each piece of the second AV data corresponding to each section until the section immediately before, which is specified in the section identification information as a section indicating unreproduced beginning of the first AV data.

A fourth technical means is characterized by the AV data reproduction method of the third technical means, wherein if the second AV data is reproduced, based on the section identification information, the reproduction is not performed for the second AV data corresponding to sections of the sections of the first AV data not yet reproduced.

A fifth technical means is characterized by the AV data reproduction method of the third technical means, wherein the second AV data corresponding to each of the sections of the first AV data are digest data showing a synopsis for each of the sections of the corresponding first AV data.

A sixth technical means is characterized by the AV data reproduction method of the third technical means, wherein the second AV data corresponding to each of the sections of the first AV data are accompanying information showing an overview relating to one or more characters appearing in each of the sections of the corresponding first AV data.

A seventh technical means is characterized by the AV data reproduction method of the sixth technical means, wherein types of the accompanying information included are one or a plurality of types of character introduction data for characters appearing in each of the sections of the corresponding first AV data, information showing a human relationship among the characters, relevant information relating to items obtained by the characters or relevant information relating to animals and items appearing in each of the sections of the corresponding first AV data.

An eighth technical means is characterized by the AV data reproduction method of any one of the fifth to seventh technical means, wherein if the second AV data is reproduced, the digest data or any one of the types of the accompanying information can be selected and reproduced as the second AV data to be reproduced.

A ninth technical means is characterized by the AV data reproduction method of any one of the third to seventh technical means, wherein when the reproduction of the second AV data is completed or when a user instructs to switch to reproduction of the first AV data during the reproduction of the second AV data, the reproduction is started from the beginning of a section which is in the middle of reproduction and not completely reproduced or from the beginning of a section which is not reproduced at all.

A tenth technical means is characterized by the AV data reproduction method of any one of the third to seventh technical means, wherein if the second AV data is reproduced after reproduction is instructed to stop or is instructed to switch to reproduction of the second AV data during reproduction of any section of the sections of the first AV data to stop the reproduction of the first AV data in the middle of the section, when the reproduction of the second AV data is completed or when a user instructs to switch to reproduction of the first AV data, the reproduction of the first AV data is resumed from the position where reproduction is stopped.

Effect of the Invention

By applying a file format based on an AV data recording method and AV data reproduction method according to the present invention as an file format for AV data content recorded on an AV data recording medium such as DVDs and by applying the AV data recording method and AV data reproduction method according to the present invention enabling recording and reproduction of the AV data content based on such a file format to an AV data recording/reproduction apparatus, second AV data (e.g., digest data, character introduction data and the like) associated with an AV data main volume (first AV data) can be watched correspondingly to the AV data main volume, and control can be performed for not watching the second AV data corresponding to an unviewed portion of the AV data main volume.

Therefore, by reproducing as the second AV data corresponding to the main volume, reproduction can be performed for digest data showing a synopsis of a main volume already watched, character introduction data relating to characters appearing in the main volume, character-relationship data between characters, relevant information relating to various items appearing in the main volume and item-acquisition data for items obtained by a main character of the main volume, depending on selection of a user. Further, the AV data recording method, AV data reproduction method and AV data recording medium according to the present invention can be applied to AV data with a multistory type scenario.

PREFERRED EMBODIMENTS OF THE INVENTION

Hereinafter, embodiments of an AV data recording method, AV data reproduction method and AV data recording medium according to the present invention are described with reference to the drawings.

Figure 1:
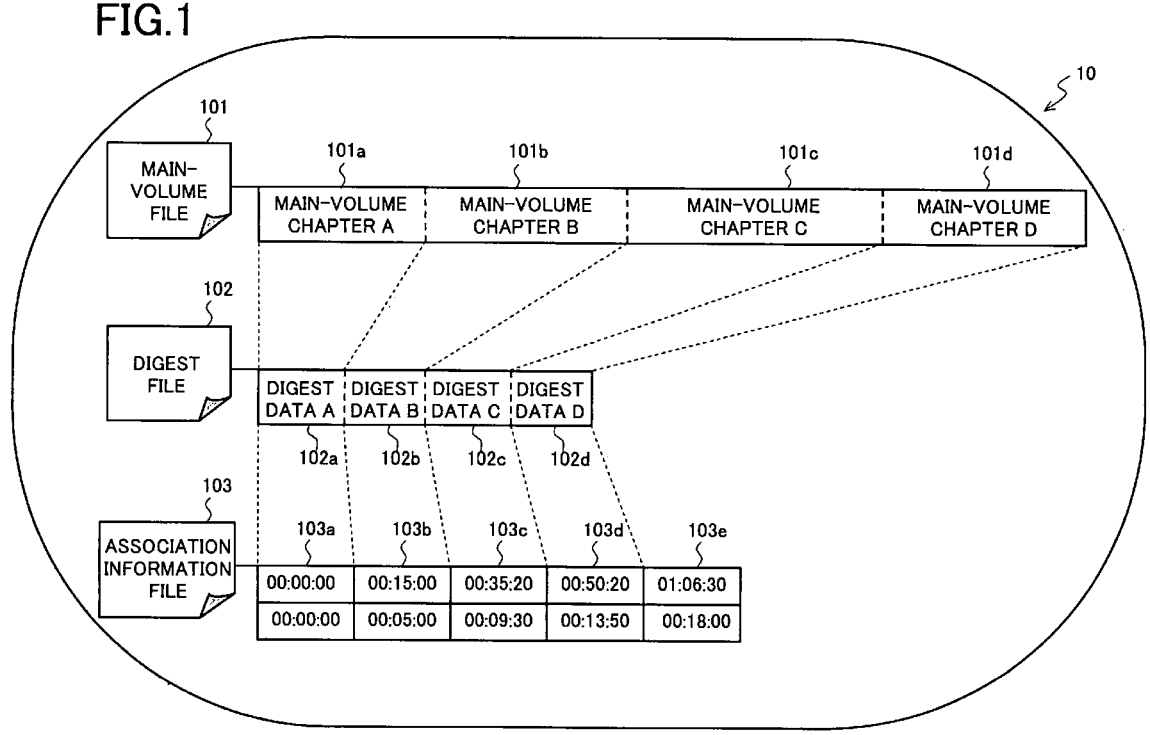
FIG. 1 is a file structure diagram showing an example of a file structure relating to AV data recorded on an AV data recording medium according to the present invention.

As a first embodiment, a description is made for the most basic structure example of AV data recorded on an AV data recording medium with reference to FIG. 1. FIG. 1 is a file structure diagram showing an example of a file structure relating to AV data recorded on an AV data recording medium according to the present invention.

As shown in FIG. 1, an AV data recording medium 10 records a main-volume file 101 which is first AV data recording a main volume of content (e.g. a movie) relating to the AV data, a digest file 102 which is second AV data recording digest content showing a synopsis of the main volume content, and an association information file 103 recording information indicating a corresponding relationship between the main-volume file 101 which is the first AV data and the digest file 102 which is the second AV data, for each one of AV data files.

Although the main-volume file 101, the digest file 102 and the association information file 103 are shown as separate files in FIG. 1, these files may be configured to be brought together as a same file or a plurality of files in the present invention. Alternatively, each file may be configured such that each file or a plurality of files and the rest are recorded on different separate AV data recording media 10.

The main-volume file 101 is configured to be divided into one or more sections, i.e., chapters, and the file structure example shown in FIG. 1 shows an example of dividing into four (4) chapters. Scenarios of each chapter is assumed to be in the order of a main-volume chapter A 101a, main-volume chapter B 101b, main-volume chapter C 101c and main-volume chapter D 101*d*, in order of time. Corresponding to each chapter of the main volume, the digest file 102 is also divided into digest data A 102*a*, digest data B 102*b*, digest data C 102*c* and digest data D 102*d*, which are recorded correspondingly to each chapter as information showing a synopsis of each chapter of the main-volume file 101.

The association information file 103 is a file indicating a corresponding relationship between each chapter of the main volume and the corresponding digest data. As the association information file 103, the file structure example shown in FIG. 1 records association information A 103*a* indicating correspondence between a start time "00:00:00" of the main-volume chapter A 101*a* and a start time "00:00:00" of the digest data A 102*a*, association information B 103*b* indicating correspondence between a start time "00:15:00" of the main-volume chapter B 101*b* and a start time "00:05:00" of the digest data B 102*b*, association information C 103*c* indicating correspondence between a start time "00:35:20" of the main-volume chapter C 101*c* and a start time "00:09:30" of the digest data C 102*c*, association information D 103*d* indicating correspondence between a start time "00:50:20" of the main-volume chapter D 101*d* and a start time "00:13:50" of the digest data D 102*d*, and association information E 103*e* indicating correspondence between an end time "01:06:30" of the main-volume chapter D 101*d* indicating the end of the main-volume file 101 and an end time "00:18:00" of the digest data D 102*d*.

However, the association information file 103 is not limited to time information indicating such start and end times, and any pieces of information may be used as long as the information can define correspondence between respective sections of the main-volume file 101 and digest file 102, such as an offset position and a chapter number of each chapter of the main-volume file. Also, since the file structure example shown in FIG. 1 is shown as an example that the end times of each main-volume chapter and each corresponding digest data are the same as the start times of the next main-volume chapter and the corresponding digest data, the end times of each main-volume chapter and each corresponding digest data are omitted in this format.

However, the end times of each main-volume chapter and each corresponding digest data may be different from the start times of the next main-volume chapter and the corresponding digest data, and in such a case, each section must be associated correspondingly to both times of the end times of each main-volume chapter and each corresponding digest data and the start times of the next main-volume chapter and the corresponding digest data.

Figure 2:
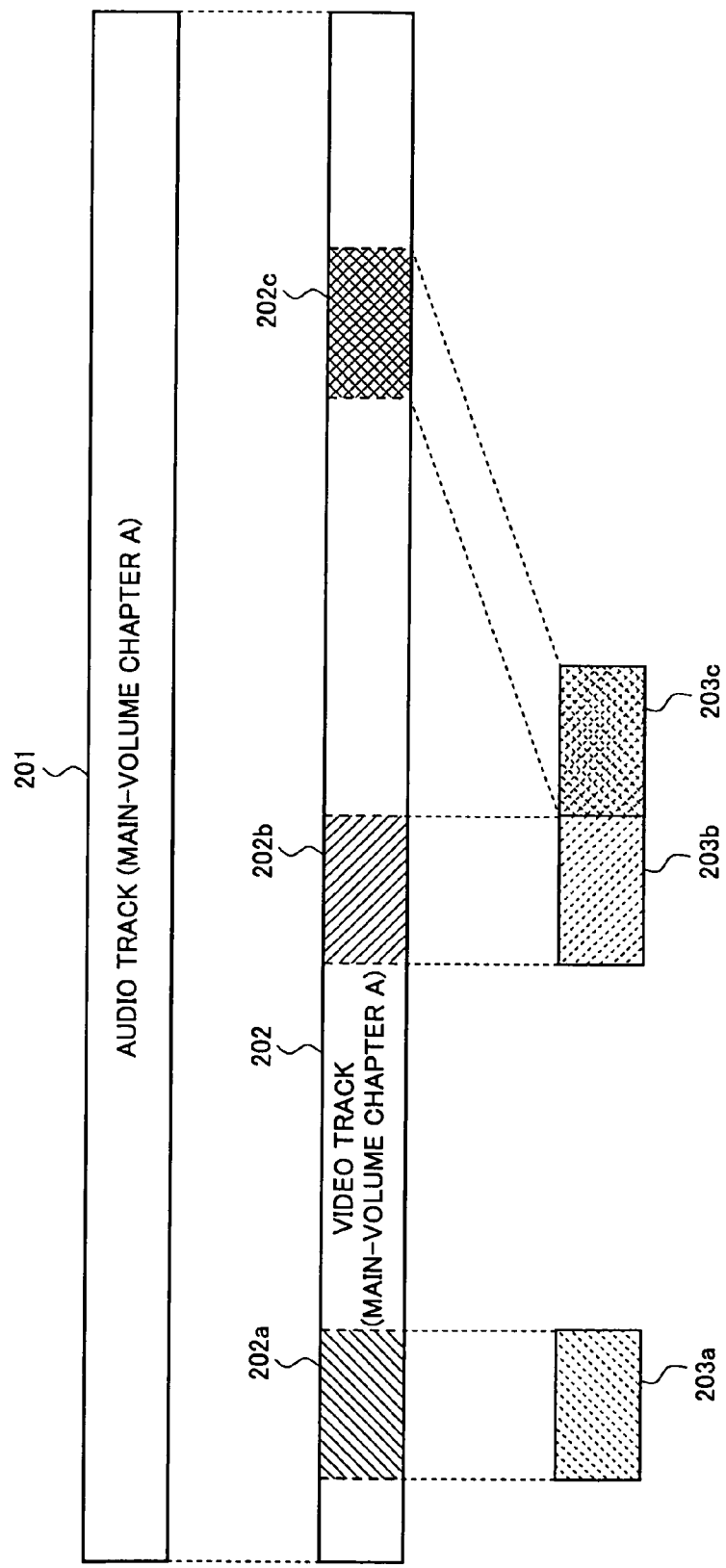
FIG. 2 is a track structure diagram showing an example of a track structure storing content to be referred by each program.

Then, assuming that the main-volume file 101 and the digest file 102 are recorded as programs indicating a reproduction order, a description is made for a structure example of each track storing the content to be referred by each program with reference to FIG. 2. FIG. 2 is a track structure diagram showing an example of a track structure storing the content to be referred by each program.

The main-volume chapter A 101*a* of the main-volume file 101 shown in FIG. 1 refers to an audio track 201 recording audio information of the main-volume chapter A and a video track 202 recording video information of the main-volume chapter A. The digest data A 102*a* of the digest file 102 refers to digest video tracks 202*a*, 202*b* and 202*c* which are portions (video information showing a synopsis) of the video track 202 of the main-volume chapter A and digest audio tracks 203*a*, 203*b* and 203*c* corresponding to each digest video track.

As the digest audio track, the audio data of the audio track different from the audio track 201 of the main volume are referred because it is assumed that the audio description describing the content of the main-volume chapter A 101*a* is inserted as the audio data to be utilized as the digest content, however, the present invention is not limited to such audio data of the audio track different from the audio track 201 of the main volume and, as is the case with the video information, the audio data of the audio track 201 of the main volume may be used as the digest audio content.

Also, in the track structure example shown in FIG. 2, by utilizing a portion of video data recorded on the video track 202 of the main volume as the digest content, the capacity of the digest contents can be cut down, however, a separate video track may be referred, which is completely different from the video track 202 of the main volume.

Although the main-volume chapter A 101*a* and digest data A 102*a* have been described as the track structure example shown in FIG. 2, the identical structure can be applied to the main-volume chapter B 101*b*, main-volume chapter C 101*c* and main-volume chapter D 101*d* as well as the digest data B 102*b*, digest data C 102*c* and digest data D 102*d* corresponding to each main-volume chapter.

Also, in the track structure example shown in FIG. 2, the main-volume file 101 and digest file 102 have been described as programs indicating a reproduction order of the content, however, the main-volume file 101 and digest file 102 may be in a format which includes data of each of video and audio tracks. Further, data of each track may be configured to be multiplexed in order to ensure seamless reproduction.

Figure 3:
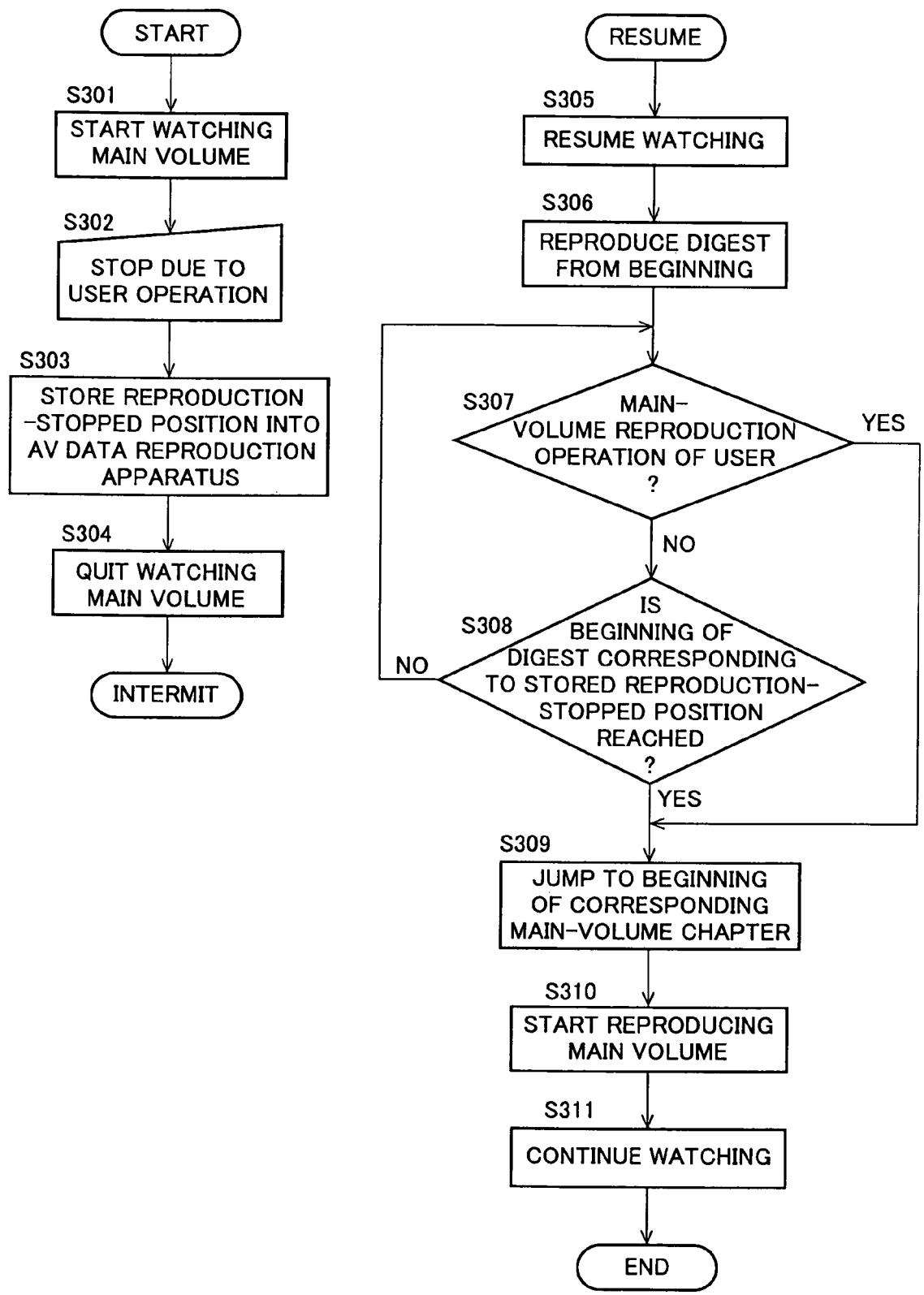
FIG. 3 is an operation flowchart for describing operation when digest data are reproduced after a reproduction intermission of the content recorded on the AV data recording medium.

Then, a description is made for operation when reproducing the content (AV data) recorded on the AV data recording medium 10 in the file format shown in FIG. 1 and FIG. 2 with the use of a flowchart. FIG. 3 is an operation flowchart for describing operation when the digest data are reproduced after a reproduction intermission of the content recorded on the AV data recording medium 10.

First, a user loads the AV data recording medium 10 recording AV data the user want to watch into an AV data reproduction apparatus and starts watching the main-volume file 101, i.e., the first AV data, from the beginning of the AV data (step S301). If operation for stopping the reproduction is performed by the user for any reason in the middle of the reproduction (step S302), the AV data reproduction apparatus controlling the reproduction of the AV data once memorizes a position where the reproduction of the main-volume file 101 of the AV data is stopped (step S303) and terminates the reproduction of the main-volume file 101, and the user stops watching (step S304).

In another occasion, the user reloads the AV data recording medium 10 recording the reproduction-stopped AV data into the AV data reproduction apparatus and performs operation for watching the rest of the main-volume file 101 of the AV data (step S305), and if the user selects digest reproduction requesting reproduction of the digest file 102 which is the second AV data in order to comprehend the synopsis of the main-volume file 101 of the AV data before the position previously watched, operation is started for sequentially reproducing the digest file 102 of the AV data from the beginning (step S306). At this point, since the user instructs the reproduction of the digest file 102 rather than the reproduction of the main-volume file 101 of the AV data (NO in step S307), then, the reproduction-stopped position of the main-volume file 101 of the AV data stored in the AV data reproduction apparatus in step S303 is checked against the reproduction position of the digest file 102 currently in process of the digest reproduction (step S308).

If the stored reproduction-stopped position of the main-volume file 101 of the AV data is included in, for example, the main-volume chapter C 101*c* of FIG. 1, the corresponding digest content of the digest file 102 is the digest data C 102*c*. Therefore, in step S308, if the reproduction position currently in process of the digest reproduction is not reached to the beginning of the digest data C 102*c* (NO in step S308), the digest reproduction is continued and the operation returns to step S307. On the other hand, if the reproduction position currently in process of the digest reproduction is reached to the beginning of the digest data C 102*c* corresponding to the main-volume chapter C 101*c* including the reproduction-stopped position and attains the state for terminating the digest reproduction (YES in step S308), or if the user instructs the reproduction of the main-volume file 101 of the AV data in step S307 (YES in step S307), a shift is made to the beginning position of the chapter corresponding to the main-volume file 101 of the AV data (step S309).

For example, if the reproduction position of the digest file 102 is reached to the beginning of the digest data B 102*b* and if the reproduction of the main-volume file 101 of the AV data is instructed during the reproduction of the digest data B 102*b* (YES in step S307), a jump is made to the beginning position of the main-volume chapter B 101*c*. Alternatively, if the digest reproduction is completed to the beginning of the digest data C 102*c* corresponding to the main-volume chapter C 101*c* including the reproduction-stopped position stored in the AV data reproduction apparatus, i.e., the end of the digest data B 102*b* located immediately before the digest data C 102*c* (YES in step S308), a jump is made to the beginning position of the main-volume chapter C 101*c* corresponding to the digest data C 102*c* (step S309). After that, by starting the reproduction of the main-volume file 101 of the AV data from the beginning position of the main-volume chapter C 101*c* (step S310), the user can continue watching the main-volume file 101 of the AV data from the beginning of the section which is in the middle of reproduction and not completed or from the beginning of the section which is not reproduced at all if the section in the middle of reproduction does not exist, after watching the digest of the AV data (step S311).

By following such a procedure, the user can certainly watch the digest portion from the beginning corresponding to the main-volume portion of the AV data previously watched and can reproduce and watch the rest of the main volume which is not yet watched, after understanding a synopsis relating to the portion of the main volume already watched (i.e., the portion reproduced in the past).

Although the operation example shown in FIG. 3 is shown as an example which stores the reproduction-stopped position of the intermission into the AV data reproduction apparatus, in the present invention, the reproduction-stopped position is not necessarily needed to be stored into the AV data reproduction apparatus. However, in such a case, the user must provide a trigger for switching the digest reproduction to the main-volume reproduction at the point when the digest reproduction position reaches to the digest portion corresponding to the main volume of the AV data which is not yet watched as shown in step S307 of FIG. 3.

Also, the operation example shown in FIG. 3 is shown as an example that a jump is made to the beginning position of the main-volume chapter C 101*c* as shown in step S309 at the point when the reproduction of the digest file 102 is completed to, for example, the end of the digest data B 102*b* immediately before the digest data C 102*c* corresponding to the main-volume chapter C 101*c* including the reproduction-stopped position stored in the AV data reproduction apparatus, however, the jump may be made to the reproduction-stopped position itself stored in the AV data reproduction apparatus.

Further, in the operation example shown in FIG. 3, a description is made for the case that the digest reproduction of the portion already watched is performed before reproducing the rest of the main-volume file 101 after the main-volume file 101 of the AV data is instructed to be stopped in the middle of the reproduction, however, in the case such that the user happens to temporarily go away in the middle of the watching of the main-volume file 101, the main-volume reproduction mode can be switched to the digest reproduction mode by instructing a switch to the digest reproduction in order to reconfirm a synopsis of the main-volume file 101 already reproduced.

Then, as a second embodiment of an AV data recording method, AV data reproduction method and AV data recording medium according to the present invention, a description is made for the case that components of the second AV data is constituted by a character introduction file relating to characters appearing in the main volume of the content (first AV data), instead of the digest file shown in the first embodiment. First, in the file structure example shown in FIG. 1, the digest file 102 is replaced by a character introduction file 102' composed of introduction content relating to one or more characters appearing in the main-volume file 101 (i.e., the first AV data). Although the character introduction file 102' replaced with the digest file 102 shown in FIG. 1 is a file recording a program for reproducing AV content for character introduction, AV data of the character introduction may be included as is the case with the embodiment 1. As is the case with the digest file 102 of the embodiment, the character introduction file 102' is divided into character introduction data A 102'*a*, character introduction data B 102'*b*, character introduction data C 102'*c* and character introduction data D 102'*d* corresponding to the main-volume chapter A 101*a*, main-volume chapter B 101*b*, main-volume chapter C 101*c* and main-volume chapter D 101*d*, respectively, which are constituted by character introduction content relating to characters appearing in each chapter, i.e., accompanying information indicating an overview of the characters.

The correspondence to each main-volume chapter means that a personality revealed by watching, for example, the character introduction data B 102'*b* is a personality revealed by watching the main volume (first AV data) to the main-volume chapter B 101*b*. Therefore, the details (personality) additionally revealed by watching the subsequent next main-volume chapter C 101*c* is not revealed by watching the character introduction data B 102'*b*.

As is the case with the first embodiment, the main-volume file 101 and the character introduction file 102' may refer to the same AV data recording medium 10 or may be made up of different AV data recording media 10.

Figure 4:
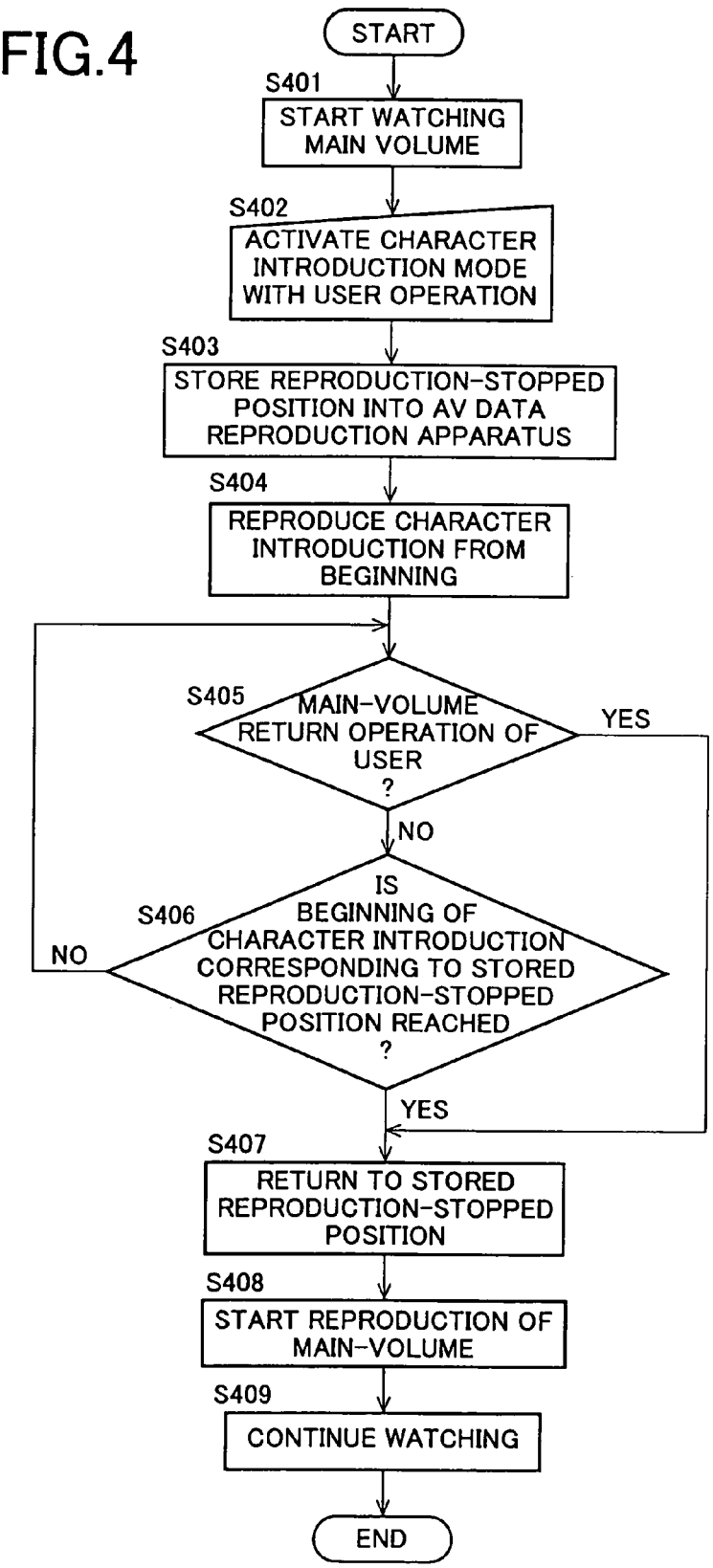
FIG. 4 is an operation flowchart for describing operation when switching to a character introduction file to reproduce character introduction data of appearing characters during reproduction of the content recorded on the AV data recording medium.

Then, a description is made for operation when reproducing the content with the character introduction file 102' recorded on the AV data recording medium 10, instead of the digest file 102 shown in FIG. 1, with the use of a flowchart shown in FIG. 4. FIG. 4 is an operation flowchart for describing operation when switching to the character introduction file 102' to reproduce the character introduction data of the appearing characters during reproduction of the content recorded on the AV data recording medium 10.

First, a user loads the AV data recording medium 10 recording AV data the user want to watch into an AV data reproduction apparatus and starts watching the main volume file 101, i.e., the first AV data, from the beginning of the AV data (step S401). In the middle of watching the main-volume file 101 of the AV data, if the user wants to check a personality of a character A appearing in the main-volume file 101 already watched, the user instructs to activate a character introduction mode relating to the character A (step S402). Such an activation instruction of the character introduction mode may be any user interface including buttons and keys. For example, by pressing down a button to make the transition to the character introduction mode for displaying personalities of the characters, the character introduction mode may be activated to display a plurality of the appearing characters corresponding to the stopped main-volume chapter, and a selection button may be operated to select and specify the character A desired to be checked from the displayed characters.

By activating the character introduction mode, the AV data reproduction apparatus controlling the reproduction of the AV data once memorizes a position where the reproduction of the main-volume file 101 of the AV data is stopped (step S403) and reproduces the character introduction file 102' introducing the personality of the specified character A from the beginning (step S404). At this point, since the user instructs to reproduce the character introduction file 102' instead of returning to the reproduction operation of the main-volume file 101 of the AV data (NO in step S405), then, the reproduction-stopped position of the main-volume file 101 of the AV data stored in the AV data reproduction apparatus in step S403 is checked against the reproduction position of the character introduction file 102' currently reproduced (step S406).

If the stored reproduction-stopped position of the main-volume file 101 of the AV data is included in, for example, the main-volume chapter C 101c of FIG. 1, the corresponding character introduction content of the character introduction file 102' is the character introduction data C 102'c. Therefore, in step S406, if the reproduction position of the character introduction file 102' currently reproduced is not reached to the beginning of the character introduction data C 102'c (NO in step S406), the reproduction of the character introduction file 102' is continued and the operation returns to step S405.

On the other hand, if the reproduction position of the character introduction file 102' currently reproduced is reached to the beginning of the character introduction data C 102'c corresponding to the main-volume chapter C 101c including the reproduction-stopped position and attains the state for terminating the reproduction of the character introduction file 102' (YES in step S406), or if the user instructs to return to the reproduction of the main-volume file 101 of the AV data in step S405 (YES in step S405), a jump is made to return to a position where the reproduction of the main-volume file 101 of the AV data has been stopped, i.e., the reproduction-stopped position in the main-volume chapter C 101c corresponding to the character introduction data C 102'c (step S407).

After that, by starting the reproduction of the main-volume file 101 of the AV data from the reproduction-stopped position of the main-volume chapter C 101c (step S408), the user can continue watching the main-volume file 101 of the AV data, after watching the character introduction data relating to the characters of the AV data (step S409).

By following such a procedure, even in the middle of watching the main-volume file 101 of the AV data, the user can certainly watch the character introduction data relating to the character A appearing in the already watched section of the main-volume portion of the AV data from the beginning.

In the operation example shown in FIG. 4, a description has been made for only one character, i.e., the character A, however, the present invention is not limited to such a case. In other words, as the second AV data, accompanying information is recorded which shows the overview relating to one or more characters appearing in each corresponding section of the main-volume file 101 (first AV data) 101, and the user can specify not only one but also a plurality of types of the accompanying information simultaneously. Therefore, for example, when the character introduction mode is selected as the type of the accompanying information, if the user specifies the character introduction of a plurality of the characters appearing in the previously watched sections, the character introduction data introducing the personalities relating to a plurality of the specified characters can be sequentially reproduced and watched. Further, the character selected as the type of the accompanying information is not limited to the appearing persons and may be relevant information relating to animals or items appearing in the content of the previously watched section or may be any element included in the content.

Then, application example of the above-mentioned first embodiment is described. Typically, digest content of AV data is an edited synopsis of the main volume and is generally edited shorter than the main volume, however, in the present invention, the corresponding digest content may be content longer than the main volume. As an example of such a case, the digest content can be replaced with sub-story content and, for example, if the content of the main volume is a nonfiction movie, reference information content can be utilized as the digest content, which summarizes and records materials including videos actually recorded at the time.

Then, application example of the above-mentioned second embodiment is described. As the character introduction file 102', instead of the character introduction data, human-relationship description content may be prepared for introducing a human relationship in an understandable way, which is constituted by a still image, slide show or video to describe the human relationship among the characters. By preparing such human-relationship description content, a function can be offered to the user for easily confirming a complicated human relationship. By establishing correspondence for each section to construct the human-relationship description content such that display is not performed for characters that have not appeared yet, quality of content of the main-volume file 101 can be maintained.

Although a description has been made for the case of describing the human relationship among the characters, the present invention is not limited to such a case and, for example, a function may be provided for enabling to make reference to relevant information about items obtained by a character, for example, a main character, until the watched position of the main volume has been reached.

In other words, as information constituting the second AV data and relating to each section of the main volume (first AV data), accompanying information can be recorded, which is composed of one or any combination of digest data, sub-story content, character introduction data, human-relationship description content, relevant information about appearing animals and items and relevant information about items obtained by a character, along with flag information which can identify each piece of the accompanying information, and the user can stop watching the reproduction to select and reproduce any piece of information such as the digest data, sub-story content, character introduction data, human-relationship description content, relevant information about animals and items and relevant information about items obtained by a character of the second AV data.

Figure 5:
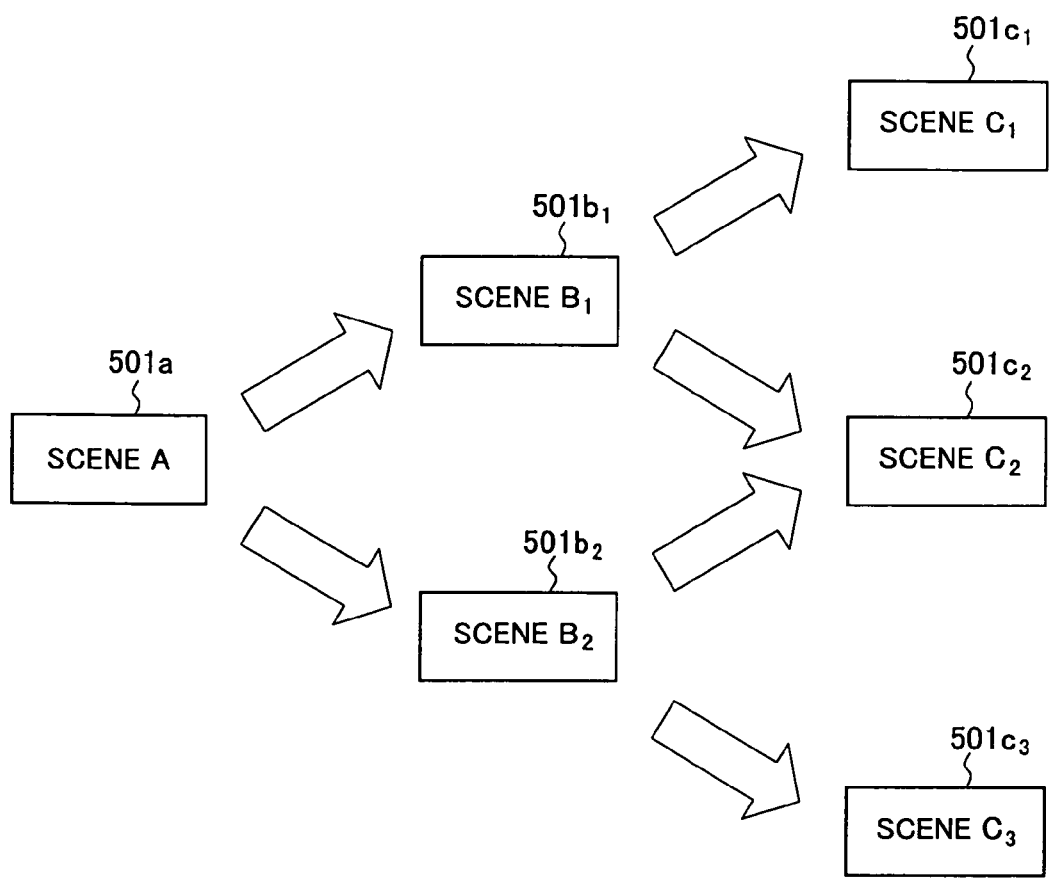
FIG. 5 is a diagrammatic representation showing an example of a multistory type scenario structure of AV data.

Then, a method is described for applying the AV data recording method, AV data reproduction method and AV data recording medium according to the present invention to a main volume with a multistory type scenario. As an example shown in FIG. 5, a multistory type scenario means a scenario configured such that the scenario can be branched by requesting a user to select an AV scene to be reproduced next, in process of watching reproduction of a main volume of AV data. FIG. 5 is a diagrammatic representation showing an example of a multistory type scenario structure of AV data.

For example, in the example shown in FIG. 5, AV data is divided into each scene of a scene A $501a$, scene $B_1$ $501b_1$, scene $B_2$ $501b_2$, scene $C_1$ $501c_1$, scene $C_2$ $501c_2$ and scene $C_3$ $501c_3$ which constitute a scenario. At the end of the scene A $501a$, a user is offered options for reproducing either the scene $B_1$ $501b_1$ or scene $B_2$ $501b_2$. Therefore, the scene $B_1$ $501b_1$ or scene $B_2$ $501b_2$ is determined to be reproduced depending on selection of the user. Also, at the end of the scene $B_1$ $501b_1$ or scene $B_2$ $501b_2$, the user is offered options for reproducing either the scene $C_1$ $501C_1$ or scene $C_2$ $501C_2$, or for reproducing either the scene $C_2$ $501C_2$ or scene $C_3$ $501C_3$.

If the AV data reproduction method according to the present invention is applied to such a multistory type scenario, a boundary of each scene is desired to be matched with boundaries of the chapter described in FIG. 1. In other words, in the scenario shown in FIG. 5, it is desired that AV data of each scene of the scene A $501a$, scene $B_1$ $501b_1$, scene $B_2$ $501b_2$, scene $C_1$ $501c_1$, scene $C_2$ $501c_2$ and scene $C_3$ $501c_3$ is configured correspondingly to chapters, i.e., sections described above, and that the relevant information, for example, digest data relating to each scene, i.e., section is configured to exist correspondingly to the scene, i.e., section.

However, in AV data with such a multistory type scenario structure, when reproducing AV data of the scene $C_2$ $501c_2$, for example, if digest data about the scene $C_2$ $501c_2$ is desired to be reproduced, it cannot be differentiated whether AV data of the scene $B_1$ $501b_1$ or AV data of scene $B_2$ $501b_2$ has been reproduced as the each scene reaching to the AV data of scene $C_2$ $501c_2$ if nothing is done. Therefore, it is not decided whether the digest data to be reproduced should correspond to AV data of the scene $B_1$ $501b_1$ or scene $B_2$ $501b_2$. In order to resolve such a problem, the reproduction order must be stored in each occasion until reaching to the reproduction of AV data of each scene, and by following the stored order, the corresponding digest data can be correctly reproduced depending on the course of respective watched scenes.

Figure 6:
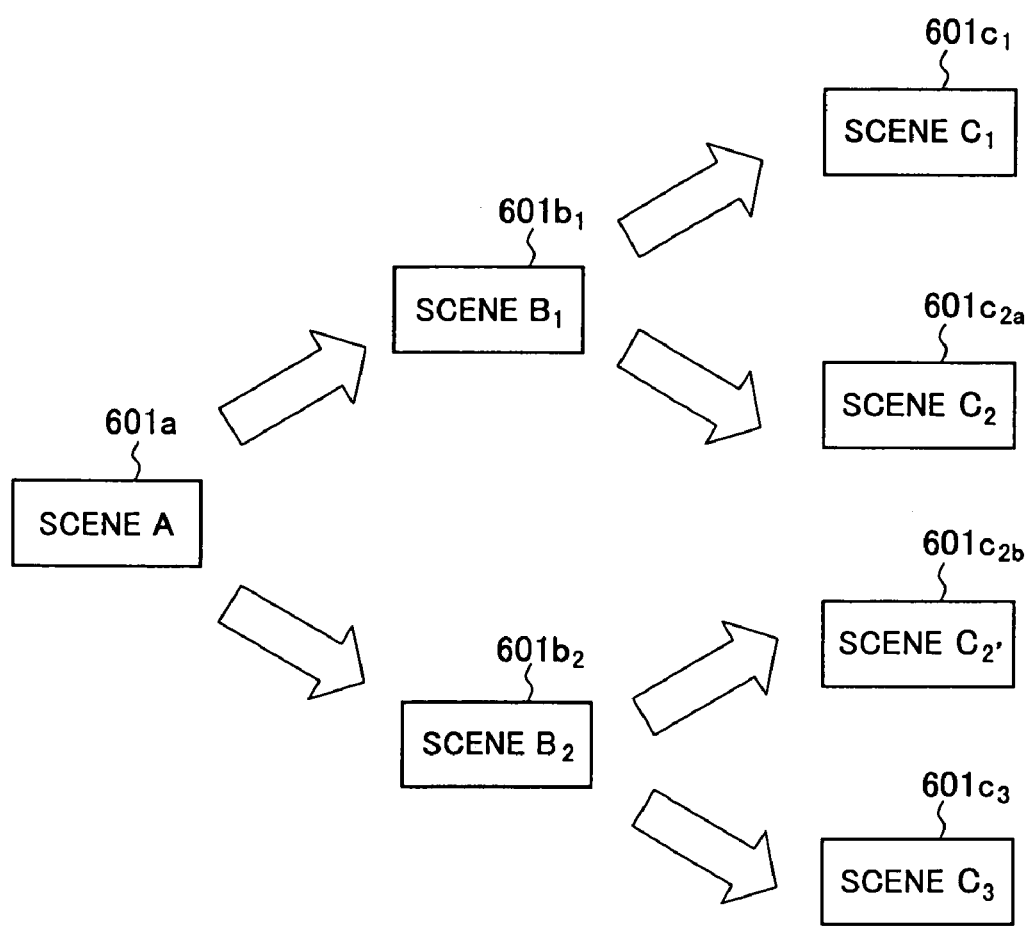
FIG. 6 is a diagrammatic representation showing a different example of a multistory type scenario structure of AV data.

Alternatively, in the case of the AV data with the multistory type scenario structure, the problem can be solved by improving FIG. 5 to be configured as follows. FIG. 6 is a diagrammatic representation showing a different example of a multistory type scenario structure of AV data, which shows an improved scenario structure of the diagrammatic representation shown in FIG. 5. In a structure example shown in FIG. 6, a scene $C_2$ $601c_{2a}$ and a scene $C_{2'}$ $601c_{2b}$ are scenarios reproducing the same scene $C_2$ and include the reproduction order to the reproduction of AV data of the scene $C_2$ as section identification information at the same time. In other words, in the structure of FIG. 6, the section identification information which can identify each scene, i.e., section, from the beginning scene of the AV data to a scene immediately before the scene made correspond to the second AV data is included in the second AV data which are the relevant information recorded correspondingly to each scene, i.e., section, as identification information for each scene until reaching to the reproduced scene.

In other words, the second AV data corresponding to the scene $B_1$ $601b_1$ and scene $B_2$ $601b_2$ include section identification information for scene A $601a$. The second AV data corresponding to the scene $C_1$ $601c_1$ and scene $C_2$ $601c_{2a}$ include section identification information for the scene A $601a$ to the scene $B_1$ $601b_1$. On the other hand, the second AV data corresponding to the scene $C_{2'}$ $601c_{2b}$ and scene $C_3$ $601c_3$ include section identification information for the scene A $601a$ to the scene $B_2$ $601b_2$.

As an example of the case of selecting the digest reproduction for the AV data with the multistory type scenario structure provided with such section identification information, for example, if the scene $C_2$ $601c_{2a}$ is stopped being watched during watching the reproduction thereof, the digest reproduction for the AV data performed in order to resume watching the rest of the stopped AV data can immediately reproduce the digest data corresponding to the scene A $601a$ to the scene $B_1$ $601b_1$ depending on the section identification information included in the second AV data corresponding to the scene $C_2$ $601c_{2a}$, and when the reproduction of the digest data is completed or when the user instructs to return to the reproduction of the main volume, the reproduction of the main volume can be continued by jumping to the beginning of the stopped scene $C_2$ $601C_{2a}$ or the reproduction-stopped position where the reproduction has been stopped earlier.

As an example of the case of applying the reproduction of the character introduction data shown in FIG. 4 as the second AV data to the AV data with the multistory type scenario structure provided with the section identification information shown in FIG. 6, for example, if a trigger for activating the character introduction mode is generated during the reproduction of the scene $C_{2'}601c_{2b}$, the reproduction can be immediately performed for the character introduction data corresponding to the scene A $601a$ to the scene $B_2$ $601b_2$ depending on the section identification information included in the second AV data corresponding to the scene $C_{2'}$ $601c_{2}b$, and when the reproduction of the respective character introduction data is completed or when the user instructs to return to the reproduction of the main volume, the reproduction of the main volume can be continued by returning to the point of time when the trigger for activating the character introduction mode is generated, i.e., the reproduction-stopped position.

By using a method for recording and reproducing the second AV data such as the method for recording and reproducing the digest data and the method for recording and reproducing the character introduction data described above, even in the case of the AV data with a multistory type scenario, the AV data recording method, AV data reproduction method and AV data recording medium according to the present invention can be applied.

DESCRIPTION OF REFERENCE NUMERALS

10—AV data recording medium; 101—main-volume file; 101a—main-volume chapter A; 101b—main-volume chapter B; 101c—main-volume chapter C; 101d—main-volume chapter D; 102—digest file; 102'—character introduction file; 102a—digest data A; 102'a—character introduction data A; 102b—digest data B; 102'b—character introduction data B; 102c—digest data C; 102'c—character introduction data C; 102d—digest data D; 102'd—character introduction data D; 103—association information file; 103a—association information A; 103b—association information B; 103c—association information C; 103d—association information D; 103e—association information E; 201—audio track; 202—video track; 202a, 202b and 202c—digest video track; 203a, 203b and 203c—digest audio track; 501a—scene A; $501b_1$—scene $B_1$; $501b_2$—scene $B_2$; $501c_1$—scene $C_1$; $501C_2$—scene $C_2$; $501C_3$—scene $C_3$; 601a—scene A; $601b_1$—scene $B_1$; $601b_2$—scene $B_2$; $601C_1$—scene $C_1$; $601C_{2a}$—scene $C_2$; $601C_{2b}$—scene $C_{2'}$; and $601C_3$—scene $C_3$.

The invention claimed is:

1. A digest recording and reproduction method, comprising:

a subchapter recording step of recording onto a recording medium main-volume audio-video data divided into subchapters; a digest recording step of recording onto the same or a different recording medium a digest that corresponds to each subchapter, wherein each digest contains audio-video data that summarizes the audio-video data of each corresponding subchapter; a correlation step of correlating each digest with each subchapter according to subchapter identification information stored as association information; and a reproduction step of automatically reproducing each digest based on said association information, beginning digest reproduction at a digest corresponding to only a first subchapter and ending digest reproduction after a digest corresponding to a subchapter immediately before the subchapter in which reproduction was interrupted is reproduced.

* * * * *